United States Patent [19]

Ammann

[11] Patent Number: 5,148,018

[45] Date of Patent: Sep. 15, 1992

[54] LASER BEAM LEVELLING DEVICE

[75] Inventor: Hans-Rudolf Ammann, Amriswil, Switzerland

[73] Assignee: Ammann Lasertechnik AG, Amriswil, Switzerland

[21] Appl. No.: 673,024

[22] Filed: Mar. 21, 1991

[30] Foreign Application Priority Data

Mar. 27, 1990 [CH] Switzerland .......................... 1013/90

[51] Int. Cl.$^5$ ............................................. G01D 5/34
[52] U.S. Cl. ..................................... 250/231.1; 33/366
[58] Field of Search ................ 250/231.1, 577; 33/366

[56] References Cited

U.S. PATENT DOCUMENTS

| | | | |
|---|---|---|---|
| 3,569,716 | 3/1971 | Lewis | 33/366 |
| 4,110,609 | 8/1978 | Beer | 250/231.1 |
| 4,154,000 | 5/1979 | Kramer | 33/366 |
| 4,254,334 | 3/1981 | Band | 250/231.1 |
| 4,590,680 | 5/1986 | Hanchett et al. | 33/366 |

Primary Examiner—Bruce C. Anderson

Attorney, Agent, or Firm—Nies, Kurz, Bergert & Tamburro

[57] ABSTRACT

The laser beam levelling device has a vessel (1) with a U-shaped cross section filled with a dark liquid. A respective photoelectric sensor (2) is located on the exterior of the two free arms of the U. The two sensors (2) are connected to an evaluating device (3). As a respective light source (4) is provided opposite the sensors (2), a clear bright/dark distinction emerges in the region of the liquid surface level. This transition from the dark part into the bright part therefore indicates exactly the height of the liquid level. By comparing the height of the liquid level in the two arms of the U, the inclination of the axis X-X can be calculated in the evaluating device (3), or it can be determined whether the vessel (1) is located in the horizontal. The respective inclination can therefore be defined with high precision. The laser beam levelling device can accordingly be erected on a site on any uneven ground. The laser plane is brought immediately into the horizontal or directly into the inclination set on a keypad.

8 Claims, 3 Drawing Sheets

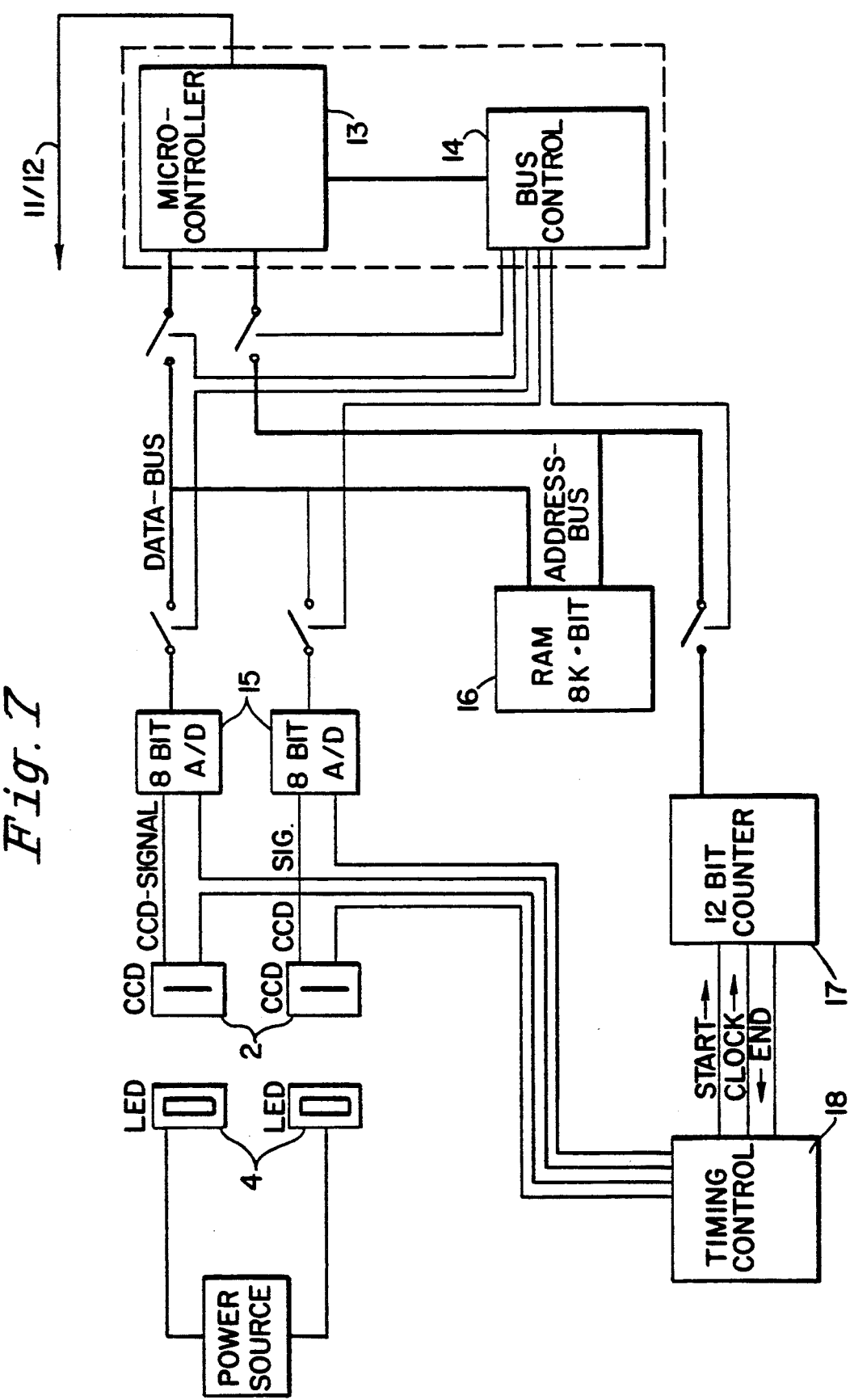

LASER BEAM LEVELLING DEVICE

FIELD OF THE INVENTION

The present invention relates to a laser beam levelling device with at least one liquid-filled vessel which cooperates with the measurement plane.

BACKGROUND OF THE INVENTION

High accuracy of measurement is required in levelling devices which are used, in particular, in building construction and civil engineering. In particular, in laser beam levelling devices where the laser beam issuing from the device is received at a relatively great distance by a receiver and is rendered visible so that large areas can be brought into the desired inclination, even small deviations of inclination on the device can lead to intolerably large faulty measurements in the receiver. As these devices are used in the open, they should also be insensitive to temperature variations.

In such devices, therefore, the operations of rendering horizontal and of inclining have been separated from one another. A movable measuring plate to which the laser plane is connected is located in the device. If the device is now erected on uneven terrain, the measuring plate is rendered horizontal by means of electrolytic levels. Electrolytic levels are filled, apart from a small gas bubble, with an electrically conductive liquid. One respective end of an electric conductor projects into the gas bubble from both sides. As soon as the level leaves the vertical, the electrical measured value changes owing to the displacement of the gas bubble and it is possible to determine that the level is no longer vertical and to which side it is inclined.

In order to incline the laser plane, a mechanical adjusting device is arranged between the measuring plate and the laser plane. This mechanism is very complicated, particularly if the laser plane is to be inclined in two axes which are at right angles to one another, and has to be produced with maximum precision.

SUMMARY OF THE INVENTION

The object of the invention is to provide a laser beam levelling device which operates very precisely and reliably. No electrically conductive liquid should be used for this purpose because it distorts the measured result if the ambient temperature is lower or higher than about 20° to 25° C.

Accordingly, the present invention provides a laser beam levelling device comprising means for emitting a laser beam which forms a laser plane serving as a measurement plane and at least one liquid-filled vessel cooperating with the laser plane, said vessel having an edge region at which at least one optical sensor is provided by means of which the height of the liquid level there can be detected, said optical sensor being connected to an evaluating device to which the measured liquid level is fed in the form of an electric signal and in which the inclination of the vessel can be calculated by reference to the determined height of the liquid level, by comparison with comparison values each corresponding to a specific inclination, or in which it is possible to determine whether the vessel and therefore the laser plane are horizontal, whereupon the laser plane can be rendered horizontal or, according to an input value, can be inclined at a desired inclination.

The laser beam levelling device according to the invention operates with high precision not possible hitherto. Furthermore, it is completely insensitive to temperature variations.

Preferably, a pair of optical sensors are arranged at mutually opposed edge regions of the vessel for detecting the height of the liquid level there, so that the inclination of the vessel can be determined by calculating the height difference of the liquid level between the two sensors.

A further very great advantage of the laser beam levelling device according to the invention is that the operations of automatically rendering the laser plane horizontal and adjusting the inclination of the laser plane are combined. If the laser beam levelling device is erected on a site, the laser plane automatically becomes horizontal or places itself directly into the inclination which has been input by means of a keypad. Therefore, it is no longer necessary for the device first to be brought into the horizontal, whereupon the laser plane is mechanically inclined from here in a second stage.

BRIEF DESCRIPTION OF THE DRAWINGS

The invention will now be described in more detail, by way of example, with reference to the drawings, in which:

FIG. 7 is a block diagram of an evaluating and control device forming part of a laser beam levelling device according to the invention.

DESCRIPTION OF PREFERRED EMBODIMENTS

Figure 1:
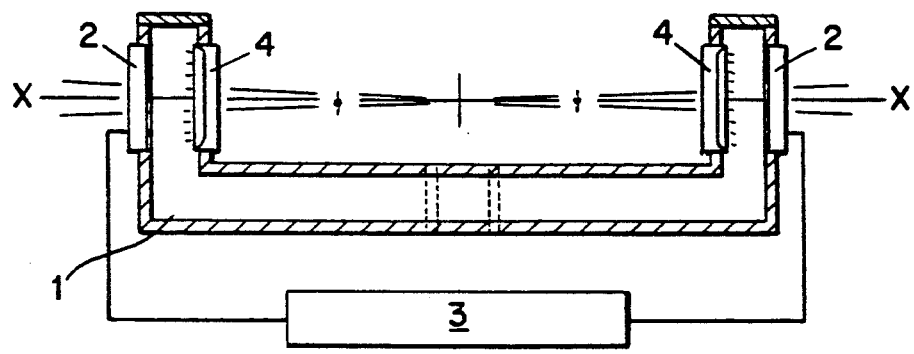
FIG. 1 is a section through the liquid-filled vessel of a first embodiment of a laser beam levelling device according to the invention.

In the example according to FIG. 1 the vessel 1 has a U-shaped cross section, a respective photoelectric sensor 2, preferably a linear CCD image sensor, being arranged on the exterior of the two free arms of the U. The two sensors 2 are connected to an evaluating device 3. The two sensors 2 are allocated a respective light source 4 mounted on the interior of the arm of the U. The liquid located in the vessel 1 is dark. By comparing the height of the liquid level in the two arms of the U, the inclination of the axis X-X can be calculated in the evaluating device and it can be determined whether the vessel 1 is horizontal.

It would also be conceivable to provide a sensor 2 on only one side of the vessel 1, each liquid level corresponding to a specific inclination. The advantage of two mutually opposed sensors 2 is, in particular, that the inclination can be calculated here from the difference in height between the two liquid levels. This height difference remains unchanged even if the liquid, or the vessel in which it is contained, expands or contracts due to temperature variations. With only one sensor, the measured result would be distorted in this case.

To determine the inclination also in a second axis which is at right angles to the axis X-X, a second U- shaped vessel part can be provided which is connected, in the region of the central cross piece of the U, to the previously described vessel, as indicated in broken lines in FIG. 1. However, it is also conceivable to provide two completely separated measurement axes which are at right angles to one another.

The optical sensors 2, as already mentioned, are so-called linear CCD image sensors. These have been developed, in particular, for facsimile units and are used there together with a lens system. A linear CCD image sensor consists essentially of image-sensitive and light-sensitive elements arranged in series. The light energy which strikes these elements is converted into electrical signals proportionally to the light intensity.

As a respective light source 4 which brightens the part of the vessel not filled with liquid is provided opposite the sensors 2, and the liquid located in the vessel 1 is dark, a clear bright/dark distinction emerges in the region of the liquid surface level. This transition from the dark part into the bright part therefore indicates precisely the height of the liquid level at the sensor 2. The sensors 2 used here have about 2000 light-sensitive elements over their length of approximately 15 mm. It is possible to establish, in the evaluating device 3, at which of these 2000 elements the liquid level is. However, it is moreover technically feasible also further to divide the measurement range within an element. A further fine division by more than 200-fold is conceivable here. It is obvious from these details that the respective inclination can be defined with incredibly high precision using the laser beam levelling device according to the invention.

Figure 2:
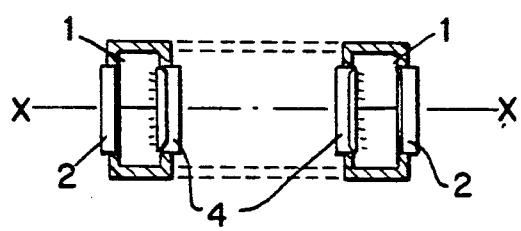
FIG. 2 shows a further embodiment of the liquid-filled vessel, also in section.
Figure 3:
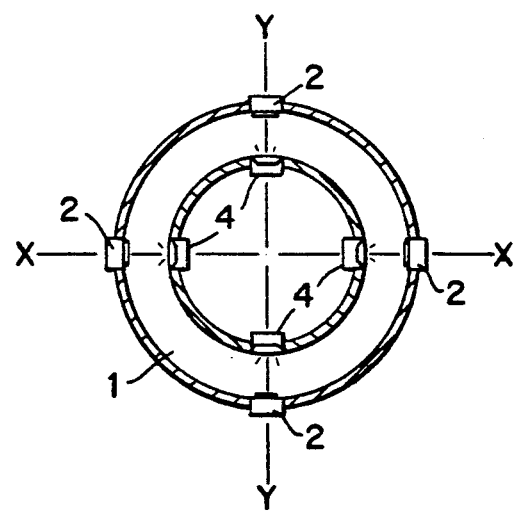
FIG. 3 shows a plan view of the vessel according to FIG. 2.

FIGS. 2 and 3 show an annular vessel 1 with two concentric vessel walls. The inclination can be measured here in two axes X-X and Y-Y which are at right angles to one another. If one axis X-X is inclined, the measured result in the second axis Y-Y is not impaired in any way. However, the vessel 1 need not necessarily be circular, as portrayed here. Polygonal solutions are also conceivable. A single light source could be provided in the centre instead of four light sources 4, in which case the internal vessel wall would have to be at least partially transparent.

Figure 4:
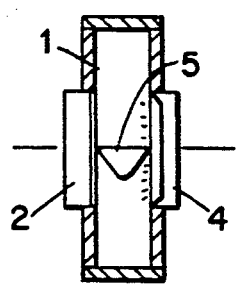
FIG. 4 shows an example of a float on the liquid.

It is also possible, as shown in FIG. 4, to provide a float 5 in the region of the sensor 2. This can be of any shape. It is merely important for it to be located between the light source 4 and the sensor 2 and to throw a shadow on the sensor 2.

Figure 5:
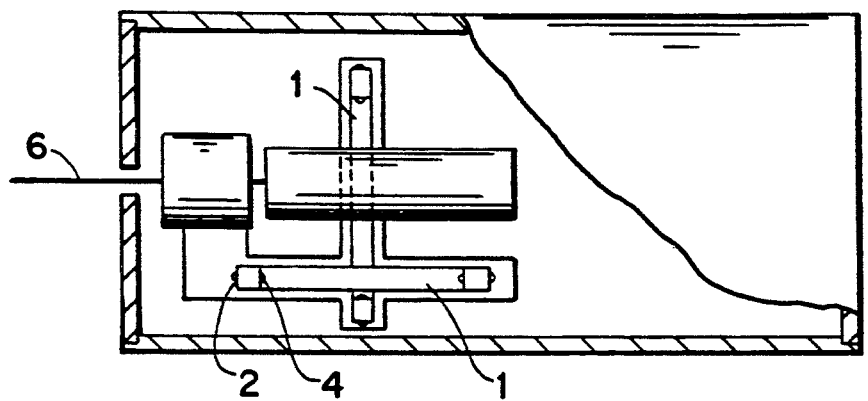
FIG. 5 shows a so-called canal construction laser with a vessel according to FIG. 1.

FIG. 5 shows a so-called canal construction laser. Such devices are tubular and are used in pipeline construction. The laser beam 6 produced by a laser light source leaves the canal construction laser at one of its ends. In the present example, two vessels 1 are provided at right angles to one another. As a result, on the one hand the laser beam can be brought into the desired inclination and, on the other hand, it is possible to ensure that the transverse axis is exactly horizontal. During adjustment of the inclination of the laser beam, therefore, the laser beam draws a vertical line at the position at which it impinges.

Figure 6:
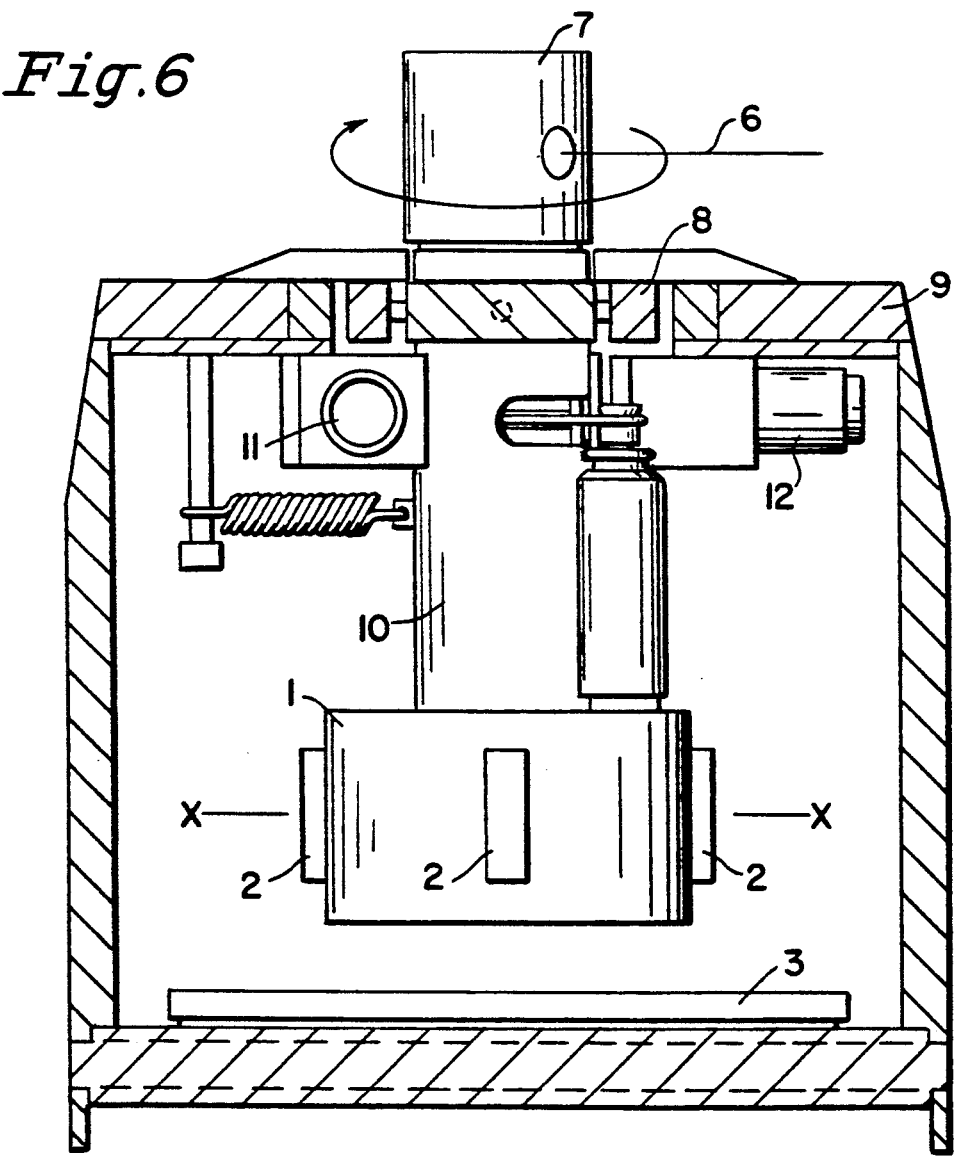
FIG. 6 shows a laser beam levelling device with a laser plane which can be inclined in two axes, with the vessel shown in FIGS. 2 and 3.

FIG. 6 shows a laser beam levelling device having rotatable reflection means 7 with which the vertically arriving laser beam 6 can be deflected into the horizontal and can be pivoted in a horizontal plane. The rotating laser beam forms a laser plane which is either visible or can be rendered visible by a receiver. A wide variety of levelling work can be carried out using this laser plane.

The laser light source is located in a length of tube 10 which is mounted vertically in a bearing 8 in the cover 9 and is pivotal by its ends so that it can be kept in the vertical or at the desired inclination. An annular vessel 1 according to FIGS. 2 and 3 is fastened at the lower end of this tube 10. The four sensors 2 and two electric motors 11 and 12 each provided with an eccentric shaft are connected to the evaluating and control device 3.

The laser beam levelling device can now be erected on a site on any uneven ground. The laser plane will bring itself immediately into the horizontal or directly into the inclination or inclinations set at a keypad. For this purpose, the evaluating and control device 3 will control the two electric motors 11 and 12 so that the necessary liquid levels are reported by the sensors 2.

The block diagram of the evaluating and control device 3 is described in FIG. 7, only the two linear CCD image sensors 2 which are preferably used for measuring an axis of inclination being shown for the sake of simplicity. The sensors 2 measure the quantity of light impinging on them or whether or not light is present. The analog signal at 15 is converted into a digital signal for processing in the computer 13 or 14. The memory for storing the measured values is designated by 16. A timing control means 18 connected to a counter 17 ensures that the measuring and comparison process is repeated continuously. The two light sources 4 are supplied by a constant power source.

Other variations and modifications are possible without departing from the spirit and scope of the invention as defined by the appended claims.

I claim:

1. A laser beam levelling device comprising: a first vessel and a second vessel, each vessel having a U-shaped cross section defined by a base and a pair of arms extending from the base, each vessel containing a liquid which occupies the base of the U and extends partially up the arms of the U, the base of said second vessel extending along an axis which intersects at right angles an axis along which the base of the first vessel extends; light emitting means positioned to emit light toward each arm of each vessel and disposed so that the light passes through said arms of the vessels and at least one optical sensor positioined at each arm of each U-shaped vessel and disposed to receive light that passes through said arm of the vessel from the light emitting means for detecting the height of the liquid level in the respective arms of the vessel, said sensors providing respective output height signals indicative of detected liquid levels in the respective arms; evaluating means connected with the sensors for comparing the respective output height signals with liquid level values stored within the evaluating means for providing height difference signals based upon a comparison of the output height signals and the stored liquid level values, as a result of which comparison the inclination of the vessel can be determined; and means for adjusting the inclination of said vessels and hence of the device in response to height difference signals from the evaluating means.

2. A laser beam levelling device according to claim 1, in which the optical sensor comprises a photoelectric image sensor.

3. A laser beam levelling device according to claim 2, wherein the photoelectric image sensor is a linear CCD image sensor.

4. A laser beam levelling device according to claim 1, in which the liquid located in the vessel is dark.

5. A laser beam levelling device according to claim 1, in which a float is located in the liquid in the region of the optical sensor.

6. A laser beam levelling device according to claim 1, in which the evaluating device contains means for converting the measurement signal into a control signal, at least one computer and at least one measured value memory.

7. A laser beam levelling device according to claim 1, in which at least one electric motor is provided for controlling movement of the vessels to achieve a desired inclination.

8. A laser beam levelling device according to claim 7, in which the evaluating device contains means for converting the measured signal into a control signal, at least one computer for comparison calculation of the liquid level and for controlling the electric motor for rendering horizontal or inclining the laser plane, at least one measured value memory and a timing control means for continuous repetition of the measuring and comparison process.

* * * * *